No. 805,625. PATENTED NOV. 28, 1905.
C. C. BLANK.
CRACKER CONVEYER AND DISTRIBUTER.
APPLICATION FILED JULY 6, 1905.
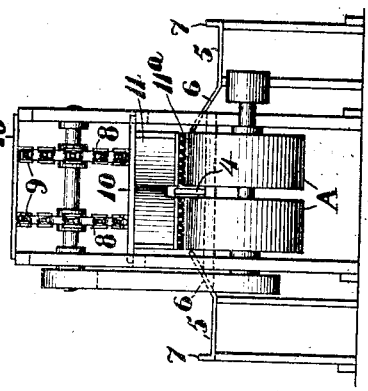
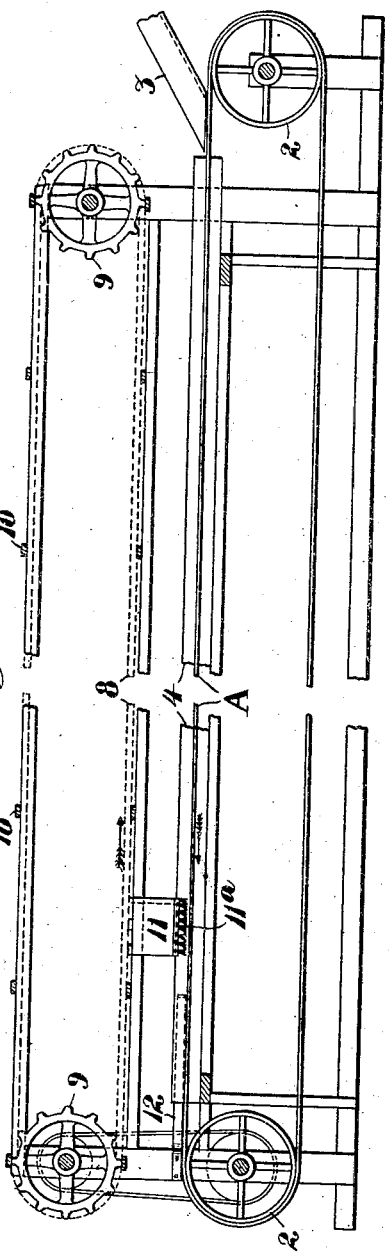
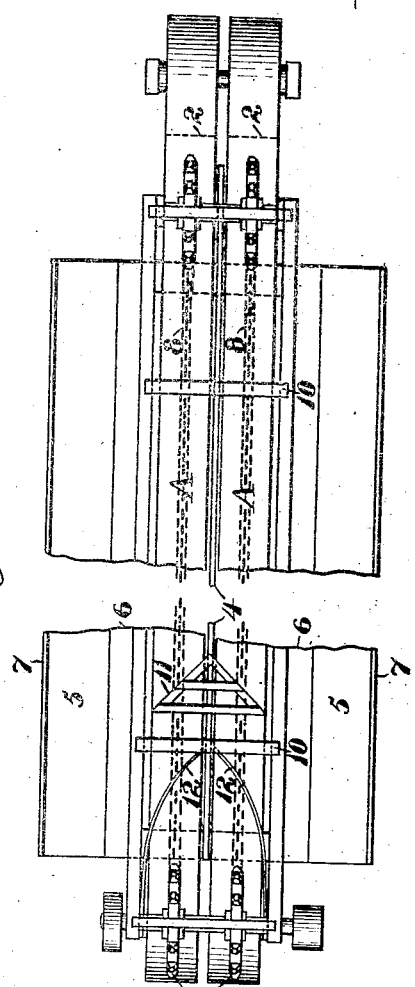
Witnesses:—
Inventor,
Charles C. Blank
By Geo. H. Strong. Atty.

UNITED STATES PATENT OFFICE.

CHARLES C. BLANK, OF SAN FRANCISCO, CALIFORNIA.

CRACKER CONVEYER AND DISTRIBUTER

No. 805,625.   Specification of Letters Patent.   Patented Nov. 28, 1905.

Application filed July 6, 1905. Serial No. 268,541.

*To all whom it may concern:*

Be it known that I, CHARLES C. BLANK, a citizen of the United States, residing in the city and county of San Francisco, State of California, have invented new and useful Improvements in Cracker Conveyers and Distributers, of which the following is a specification.

My invention relates to an apparatus which is designed for the distributing of crackers so as to be convenient to the packers.

It consists in the combination of devices whereby the crackers which are conveyed upon a traveling belt are gradually distributed to tables upon each side of the conveying-belts convenient to the operators by which they are afterward collected and packed.

It also comprises details of construction, which will be more fully explained by reference to the accompanying drawings, in which—

Figure 1 is a longitudinal vertical section of my apparatus, partly broken away. Fig. 2 is a plan view of same, partly broken away. Fig. 3 is an end view looking from the left of Fig. 1.

As shown in the drawings, A is an endless conveying-belt passing around drums 2, sufficiently apart to allow the belt as much horizontal travel as may be required.

3 is a chute through which the crackers are delivered upon the conveyer. As here shown, there are two of these belts running parallel, or a single belt may be employed having an upwardly-projecting rib at the center, as shown at 4, and the crackers are carried along on a belt or belts from one end toward the other.

Upon each side of the belt or belts are tables 5 sufficiently below the belt-level so that by means of the inclined chutes 6 articles from the belt may be delivered upon these tables, the tables having a rib 7 at the outer edge to prevent the crackers from passing off the table by any momentum which they may acquire in passing down the inclines, and the center board or rib 4 separates the crackers into approximately equal portions upon each of the conveying-belts.

Above the conveyer is an endless chain belt 8, passing around the sprockets 9. This belt has cross-bars 10 and guides upon which they travel to prevent sagging. Carried by this belt is a plow 11. This plow has its front formed of inclines standing at a certain angle across the belts A, and the front ends of these angular portions converge to a point close to the division rib or board 4.

The conveyer-belt A travels slowly in one direction, and the plow-belt travels in the opposite direction slightly faster than the conveyer-belt. The operation will then be as follows: Crackers are delivered by the chute or chutes upon the conveyer belt or belts and are slowly carried along upon this belt. The plow on the belt above travels in close proximity to the conveyer-belt, and meeting the line of crackers on the conveyer-belt it pushes them off to each side by reason of the angularity of the plowshares, and the crackers being delivered upon the inclines 6 will slide upon the table 5 and will thus be distributed in substantially even portions from one end of the table to the other. When the plow reaches the end of its travel, it passes up over a drum 9, which is contiguous to the supply-chute 3, and as it is passing along the upper part of the belt it is moved parallel with the conveyer-belt A and at a sufficient rate of speed so that it will pass the opposite drum 9 and will be in position to again discharge the crackers from the belt A by the time the latter will have arrived at the points where it will meet the plows, and the belt A will again be full of crackers. In this manner the crackers will be discharged regularly to the tables upon each side, where they are collected by the packers, who stand along these tables at a sufficient distance apart.

If by any reason the plow should fail to reach the position where it commences to discharge the crackers before the crackers upon the conveyer-belt have arrived at that point, I have shown diagonally-disposed spring members 12 arranged just above the conveyer-belt and in such position that the crackers reaching these diagonal members will be discharged upon that end of the tables contiguous to these members in the same manner that they would be discharged by the plows, with the exception that they would for the time being be discharged at one point on the tables; but the relative speed of the conveyer-belt and the plow-carrying belt is such that the plows will arrive at the point where they commence discharging the crackers at about the same time that the foremost of the crackers on the conveyer has reached the end of the belt, and few, if any, of the crackers will ever arrive at the point where the diagonally-discharging devices 12 are located.

In order to protect the crackers from breakage by the unyielding edges of the plow, I have shown the lower edges of the plows or scrapers as being formed with flexible brush-like extensions, as shown at 11", and these brush-like edges are movable to contact with the crackers, and thus prevent their being broken.

Having thus described my invention, what I claim, and desire to secure by Letters Patent, is—

1. A conveyer and distributer comprising an endless traveling belt, means for supplying articles upon the belt to be carried thereby, an endless traveling chain located above the conveyer-belt, the adjacent surfaces of the two belts moving in opposite directions, and a diagonally-disposed plow or scraper carried by the upper belt and moving in close proximity with the conveyer-belt.

2. A conveyer and distributer comprising substantially parallel endless belts having contiguous surfaces movable in opposite directions, a chute by which articles are delivered upon one end of the lower belt, to be conveyed in the opposite direction, a plow carried by the upper belt and movable in close proximity with the conveyer-belt, and tables at the side of the conveyer-belt upon which articles carried thereby are distributed by the plow.

3. A conveyer consisting of an endless traveling belt and a chute by which articles are delivered upon that end of the belt from which the travel proceeds, a table located at the side of the belt, and an incline extending between the edge of the belt and the table, an endless belt traveling parallel and in opposite direction to the conveyer-belt, a plow or scraper carried by said belt, standing diagonally with the belt so as to discharge articles carried by the belt upon the incline and table.

4. The combination in a conveyer of parallel endless traveling belts having a vertical rib between their contiguous edges, a chute by which articles are delivered upon one end of the belt to be moved toward the opposite end, and a chain or like belts traveling above and in the opposite direction from the conveyer having plows or scrapers fixed to it to project so as to travel in close proximity with the conveyer-surface, said plows being disposed diagonally with the belts and having their inner ends traveling close to the dividing-rib, inclined surfaces extending downwardly from the outer edges of the conveyer-belt, and tables upon which articles forced from the conveyer-belt are delivered.

5. In a conveying and distributing apparatus, an endless belt traveling in one direction, a superposed chain belt having its contiguous surface traveling in the opposite direction, a diagonally-disposed plow or scraper whereby articles carried by the lower belt are successively brushed off at one side of said belt, said plow having a flexible brush upon its lower edge.

In testimony whereof I have hereunto set my hand in presence of two subscribing witnesses.

CHARLES C. BLANK.

Witnesses:
S. H. NOURSE,
D. B. RICHARDS.